United States Patent
Renshaw

(10) Patent No.: US 6,371,407 B1
(45) Date of Patent: Apr. 16, 2002

(54) MECHANISM FOR VECTORING EXHAUST FLOW

(75) Inventor: Kevin John Renshaw, Fort Worth, TX (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 09/609,484

(22) Filed: Jul. 5, 2000

(51) Int. Cl.[7] ............................................. B64C 15/02
(52) U.S. Cl. ................... 244/12.5; 244/23 A; 244/12.4
(58) Field of Search ............................ 244/12.4, 12.5, 244/12.1, 13, 23 A, 23 R, 23 B; 239/265.27, 265.39

(56) References Cited

U.S. PATENT DOCUMENTS

| | | | |
|---|---|---|---|
| 2,912,188 A | * | 11/1959 | Singlemann et al. |
| 3,164,337 A | * | 1/1965 | Hooper |
| 3,528,247 A | * | 9/1970 | Riemerschmid |
| 3,705,688 A | * | 12/1972 | Smale |
| 4,004,755 A | * | 1/1977 | Hooper |
| 4,140,290 A | * | 2/1979 | Meier et al. |
| 4,301,980 A | | 11/1981 | Bradfield et al. |
| 4,343,446 A | * | 8/1982 | Langley |
| 4,713,935 A | * | 12/1987 | Szuminski et al. |
| 4,901,947 A | | 2/1990 | Raymer |
| 5,161,741 A | * | 11/1992 | Seyfang |
| 5,209,428 A | | 5/1993 | Bevilaqua et al. |
| 5,312,069 A | | 5/1994 | Bollinger et al. |
| 5,320,305 A | | 6/1994 | Oatway et al. |
| 5,779,169 A | * | 7/1998 | Sloan |
| 5,897,078 A | * | 4/1999 | Burnham et al. |

* cited by examiner

*Primary Examiner*—Charles T. Jordan
*Assistant Examiner*—T. Dinh
(74) *Attorney, Agent, or Firm*—Bracewell & Patterson, L.L.P.

(57) ABSTRACT

A mechanism and methods for directing the flow of exhaust gases associated with a V/STOL aircraft. A pair of constant area nozzles are associated with a plenum chamber that receives and contains exhaust gases. The nozzles are independently rotatable within circular exhaust openings in the plenum chamber to direct, or vector, exhaust exiting from the plenum chamber in preselected directions such as vertically downward or directions forward or aft of the vertical plane.

19 Claims, 5 Drawing Sheets

MECHANISM FOR VECTORING EXHAUST FLOW

BACKGROUND OF THE INVENTION

1. Field of the Invention

The present invention relates generally to propulsion systems for vertical and short takeoff and landing (V/STOL) aircraft. More particularly, the invention relates to mechanisms for vectoring or directing the flow of exhaust from such propulsion systems.

2. Description of the Related Art

A class of V/STOL aircraft use lift fans or lift engines to generate the thrust needed to cause the aircraft to take-off vertically as well as to move laterally through the air. The exhaust gases from the lift fans are directed, or vectored, in various directions in order to move the aircraft laterally and longitudinally.

One method of directing exhaust flow requires the use of louvers that can be moved to direct the air flow forwardly or rearwardly away from the lift fan. Such an arrangement is described in U.S. Pat. No. 5,312,069. However, as louvers are moved, they tend to obscure or close off part of the exhaust area. This is disadvantageous as it will tend to cause a loss of thrust power.

Another approach is to use a ball and socket joint to provide flow deflection. If ball and socket joints are used for movement of a nozzle, the joints are subject to wear at the points where the joint attaches to the socket. Further, such joints may not seal properly leading to loss of thrust.

SUMMARY OF THE INVENTION

The present invention provides a novel mechanism and methods for directing the flow of exhaust gases associated with a V/STOL aircraft. In a preferred embodiment, the mechanism includes a pair of constant area nozzles associated with a plenum chamber that receives and contains exhaust gases. The nozzles are independently rotatable within circular exhaust openings in the plenum chamber to direct exhaust exiting from the plenum chamber in preselected directions such as vertically downward or directions forward or aft of the vertical plane.

BRIEF DESCRIPTION OF THE DRAWINGS

FIG. 2b is an upward-facing bottom view of the components shown in FIG. 2a.

FIG. 4b is an upward-facing bottom view of the components shown in FIG. 4a.

FIG. 5b is an upward-facing bottom view of the components shown in FIG. 5a.

DETAILED DESCRIPTION OF THE PREFERRED EMBODIMENTS

General details concerning the construction and operation of V/STOL aircraft and their propulsion systems are described in U.S. Pat. Nos. 5,209,428; 5,312,069; 5,320,305 and 4,901,947, all of which are assigned to the assignee of the present invention. These patents are each incorporated herein by reference.

Figure 1:
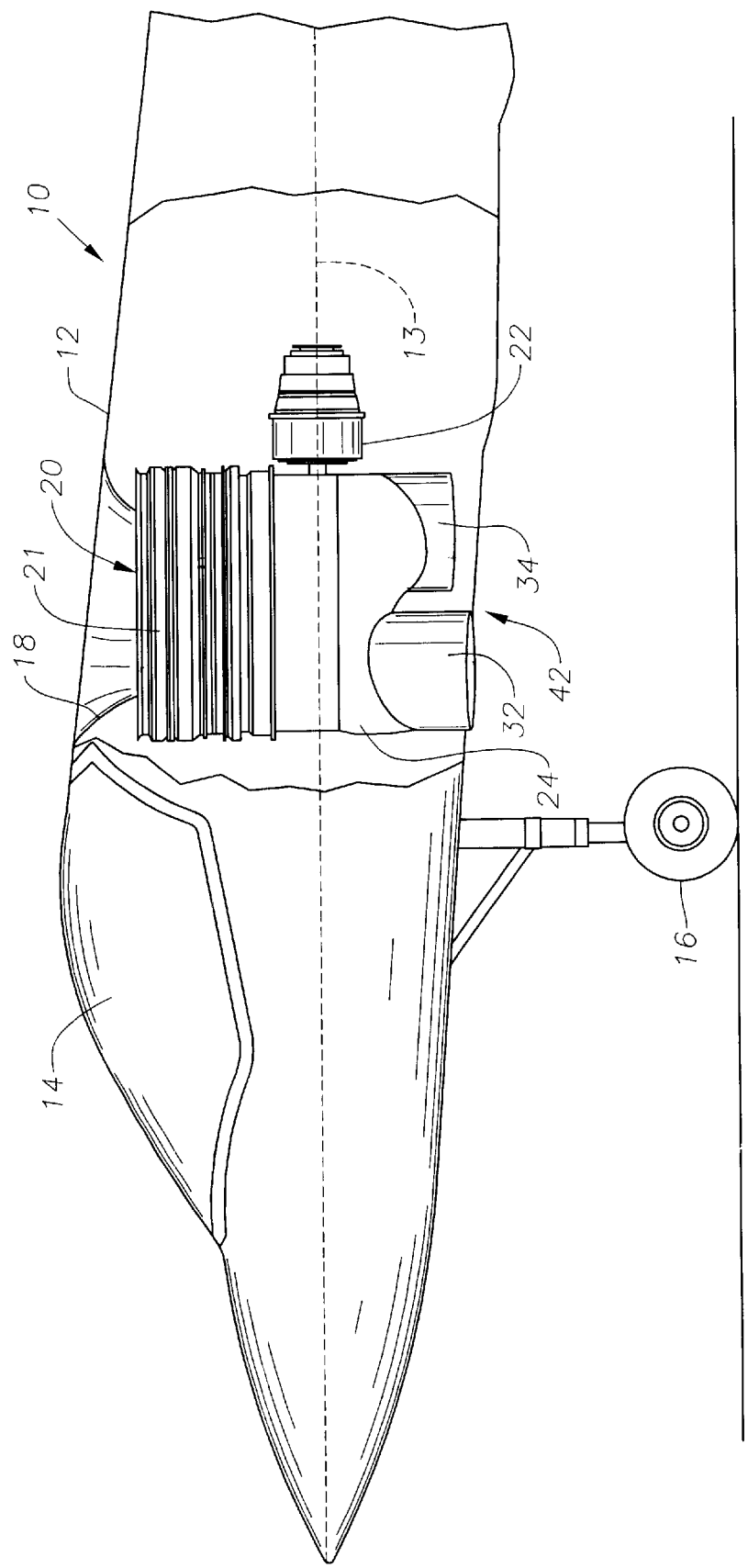
FIG. 1 is a side view, partially in cross-section, of the forward end of an exemplary V/STOL aircraft depicting placement of a lift fan, input power shaft and an exhaust system having a plenum with dual exhaust nozzles as constructed in accordance with the present invention.

FIG. 1 illustrates the forward portion of an exemplary V/STOL aircraft 10 having a fuselage 12 with a longitudinal axis 13. The fuselage 12 contains a cockpit 14, landing wheels 16 and other known features. The fuselage 12 defines an air intake vent 18 upon its upper surface. A vertically-disposed, bladed lift fan 20 is retained within the fuselage 12 to receive air from the intake bell mouth 18. The lift fan 20 is a thrust engine that generates thrust for the aircraft 10. It will be understood with reference to U.S. Pat. No. 5,209,428 that the lift fan 20 is operably interconnected with a more rearwardly-located engine section (not shown) that is also used for propulsion of the aircraft 10. The details of the more rearwardly-located fan section will not be described here. An input power shaft 22 transmits rotational power from the main engine (not shown) of the aircraft 10 to the lift fan 20 for rotation of the blades within the fan 20. The lift fan 20 is surrounded by a cylindrical housing 21 with exhaust flow tubing 23 disposed beneath. As a result, exhaust gases generated by the lift fan 20 are directed through exhaust flow tubing 23.

A plenum chamber 24 is located below the lift fan 20 and exhaust flow tubing 23 for the collection of exhaust gases generated by the lift fan 20. The construction of the plenum chamber 24 is best appreciated with reference to FIGS. 2a and 2b wherein the underside of the structure is shown in detail. The plenum chamber 24 has an outer shell that defines a pair of curved exhaust tubes 26, 28 that each terminate at a lower end in a circular exhaust opening 30. The circular openings 30 are located one behind the other along the axis 13 of the aircraft 10, as FIG. 2b of the drawings shows. The circular openings 30 are also angled laterally and longitudinally from the vertical plane. The two openings have the same angle longitudinally, but opposing matched angles laterally. A preferred angle of lateral offset from the vertical plane is 40 degrees.

Figure 6A:
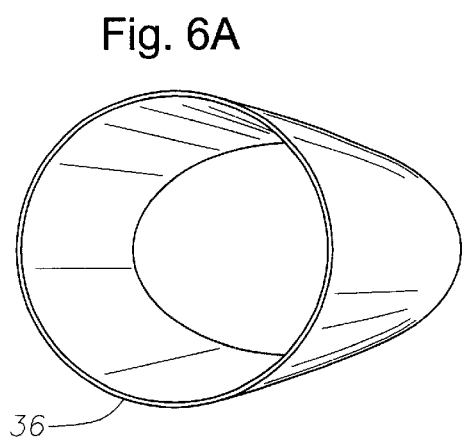
FIG. 6A is an end-on view of the proximal end of the nozzle taken along lines A—A in FIG. 6.
Figure 6:
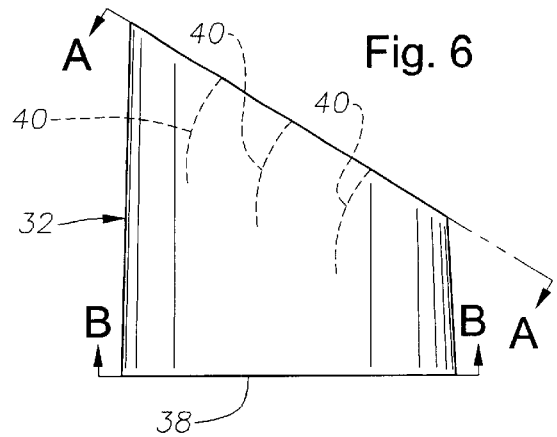
FIG. 6 is a side cross-sectional view of an exemplary nozzle shown apart from the remainder of the exhaust assembly.
Figure 6B:
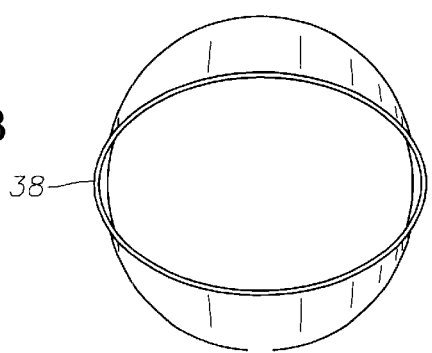
FIG. 6B is an end-on view of the distal end of the nozzle taken along lines B—B in FIG. 6.

A forward nozzle 32 and a rear nozzle 34 are rotationally affixed to the circular openings 30. Due to the "one behind the other" arrangement of the circular openings 30, the forward nozzle 32 is located forwardly from the rear nozzle 34 along the axis 13 of the aircraft 10. A single nozzle 32 is depicted in FIGS. 6, 6A and 6B. It is noted that the nozzles 32, 34 are tubular and provide a transition from a circular cross section at the plenum (see FIG. 6A) to an oval shape at the exit, as shown in FIG. 6B. The oval shape is advantageous and preferred as it helps the nozzles 32, 34 lie flatter against the lower surface of the plenum chamber 24 when the nozzles 32, 34 are rotated to more extreme angles, such as the 60 degree angle depicted in FIGS. 4a and 4b. Each of the nozzles 32, 34 have a proximal end 36 having an opening that is circular in shape so as to complimentary to the circular openings 30. The circular shape of the opening is created by cutting the nozzle at an angle from the longitudinal axis of the nozzle. The distal end 38 of each of the nozzles 32, 34 has an opening that is cut perpendicular to the longitudinal axis of the nozzle (see FIGS. 6 and 6B) and, therefore, has a substantially oval shape. Vanes 40, of a type known in the art, are retained within the proximal ends 36 of the nozzles 32, 34 to assist exhaust flow through the nozzles 32, 34.

The plenum chamber and nozzles 32, 34 can be considered collectively to provide an exhaust assembly or system 42 for vectoring exhaust gases generated by the lift fan 20. It is noted that the plenum chamber 24 and the nozzles 32, 34 are located beneath the aircraft 10 and centrally between the two lateral sides of the aircraft 10. Thus, the nozzles 32, 34 are located proximate the center of gravity for the aircraft 10.

Each of the nozzles 32, 34 are rotatable on a bearing assembly (not shown) within their respective circular openings 30 by toothed gearing, which is not shown in detail as the construction and operation of such is well known. It is noted that various styles of bearing assemblies and gearing, including rack-and-pinion and worm gearing may be used to actuate the nozzles 32, 34 and cause them to selectively rotate within the circular openings 30.

Figure 2A:
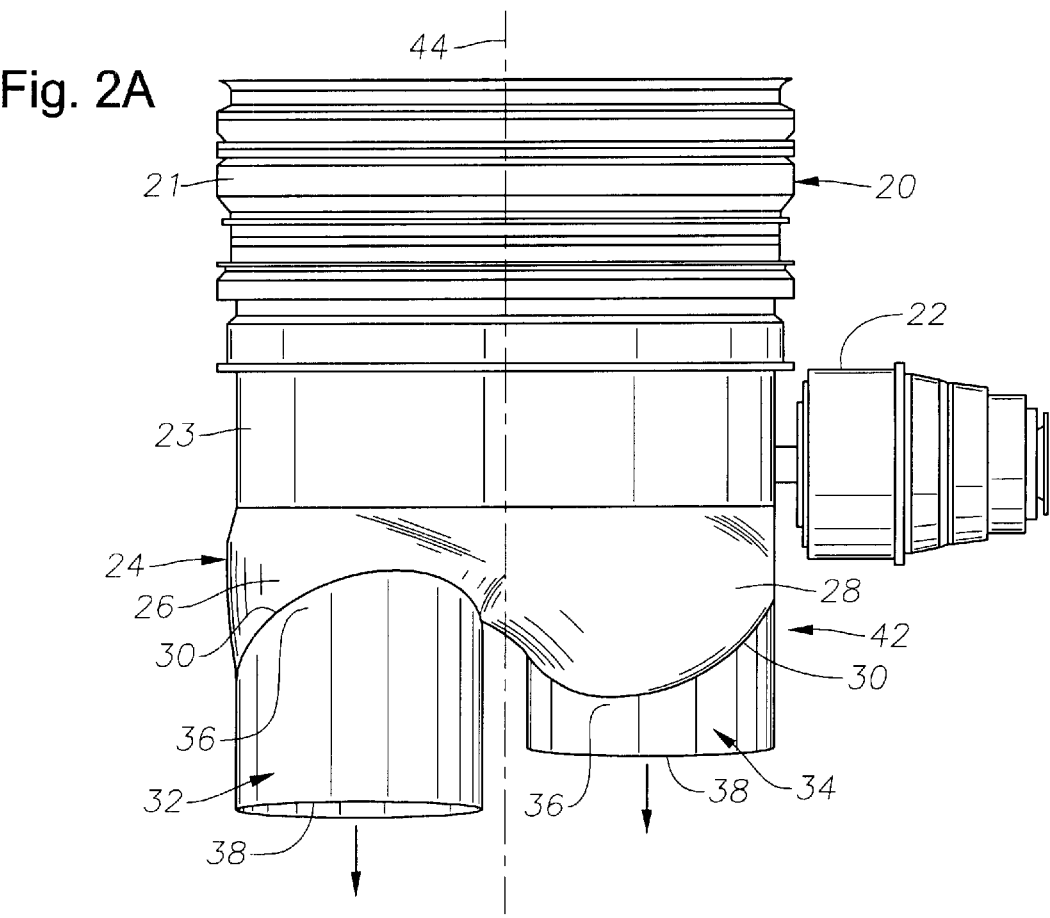
FIG. 2a is a side view of portions of the exhaust system wherein the exhaust nozzles are configured to direct exhaust vertically downwardly.
Figure 2B:
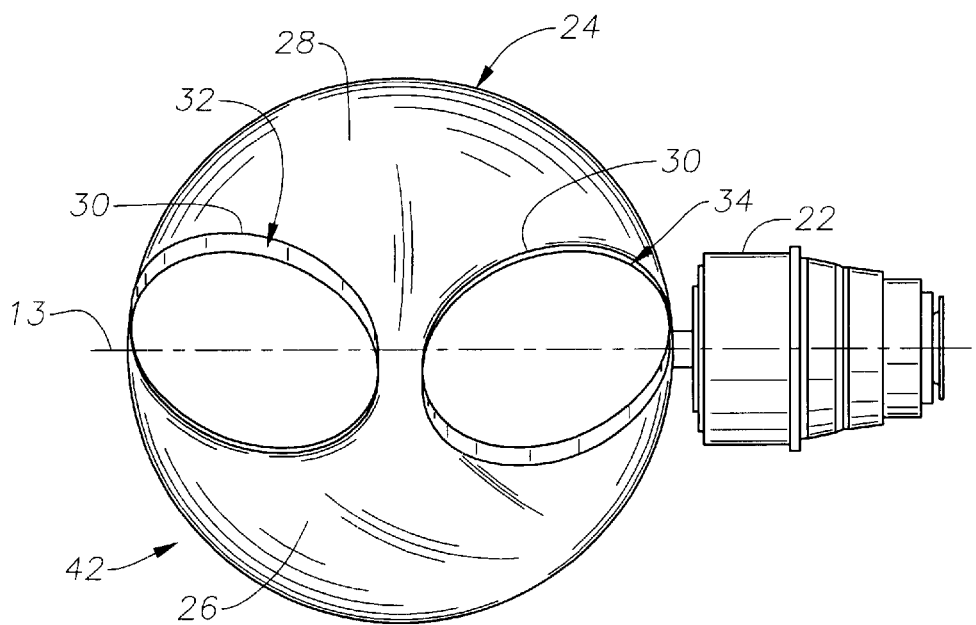

In operation, the nozzles 32, 34 may be oriented, or directed, to various angled positions by rotation of the nozzles 32, 34 within their openings 30. FIGS. 2a and 2b depict the nozzles 32, 34 oriented so that the distal end 38 of each nozzle 32, 34 is directed in a vertically downward position as would be used during the take-off phase of operation for the aircraft 10.

Figure 3:
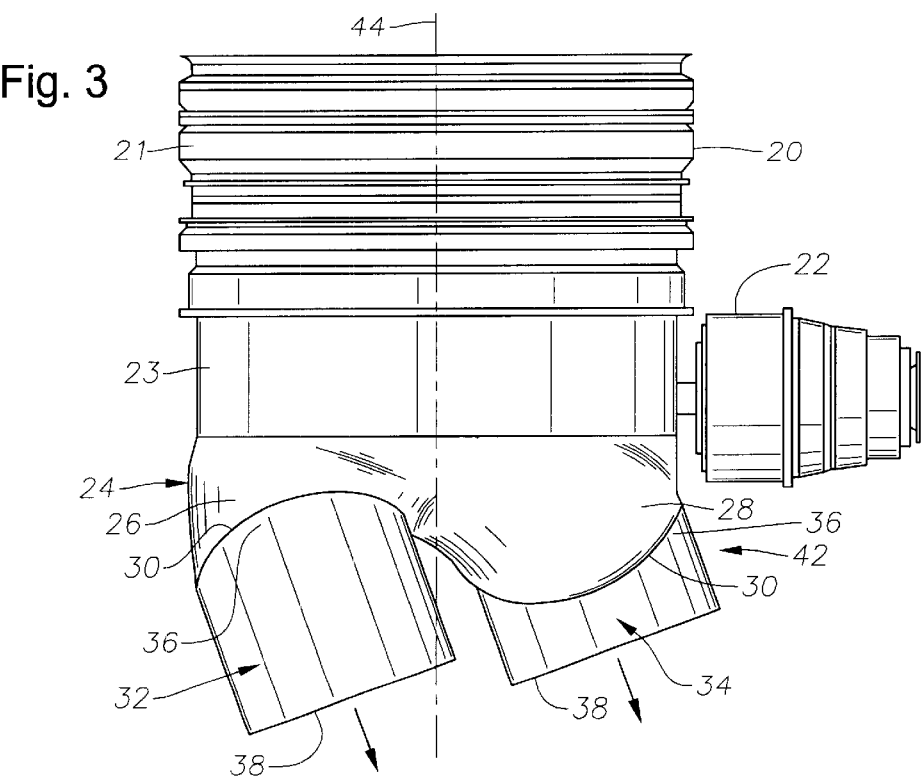
FIG. 3 is a side view of portions of the exhaust system wherein the exhaust nozzles are configured to direct exhaust 20 degrees aft.

FIG. 3 illustrates the exhaust assembly 42 in a configuration wherein the nozzles 32, 34 are oriented to direct exhaust from the plenum chamber 24 at an angle of about 20 degrees rearward of vertical plane 44. To achieve this position, the nozzles 32, 34 have been rotated within their respective circular openings 30 until the nozzles 32, 34 are oriented at the appropriate angle. The orientation of the circular exit plane determines the range of motion for the nozzles 32, 34.

Figure 4A:
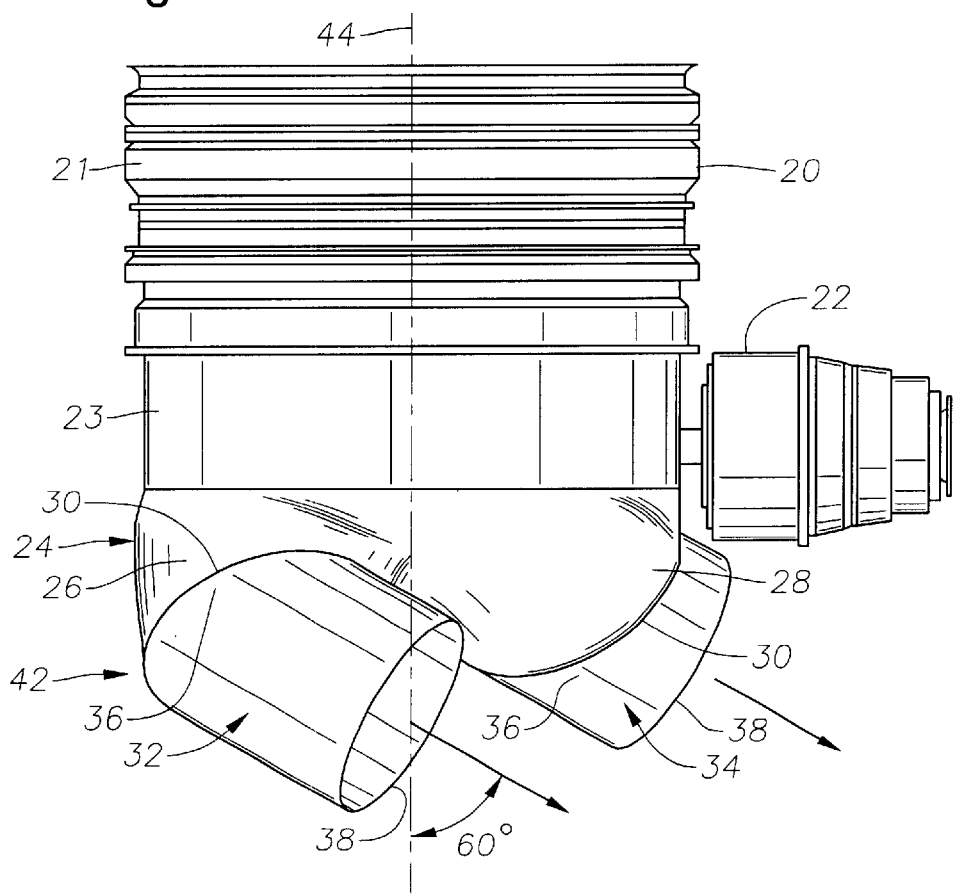
FIG. 4a is a side view of portions of the exhaust system wherein the exhaust nozzles are configured to direct exhaust 60 degrees aft.
Figure 4B:
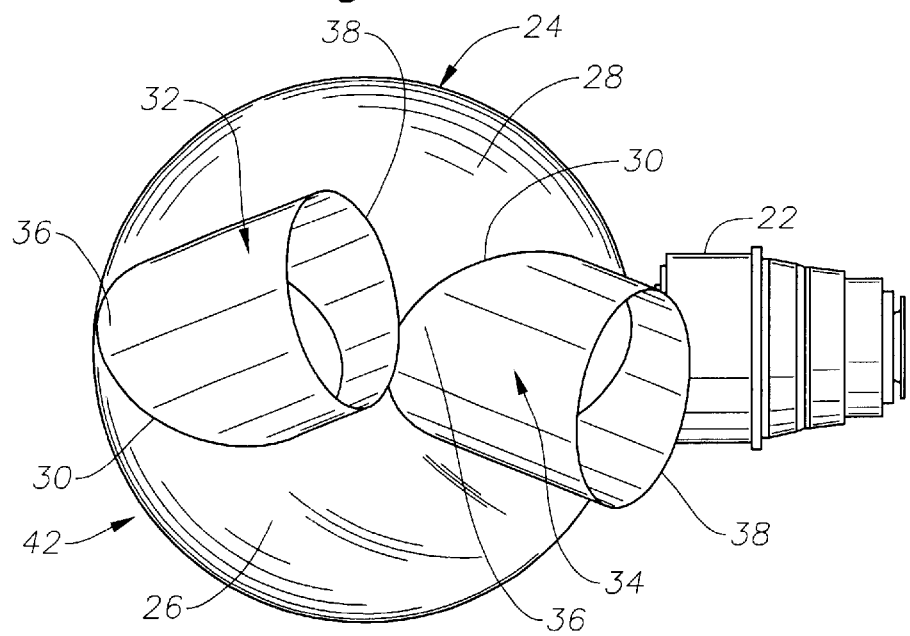

FIGS. 4a and 4b show the exhaust assembly 42 in a configuration wherein the nozzles 32, 34 are oriented so that exhaust from the plenum chamber 24 is directed rearwardly from the vertical plane at an angle of approximately 60 degrees. To achieve this position, the nozzles 32, 34 have again been rotated within their respective circular openings 30 until the nozzles 32, 34 are oriented at the appropriate angle.

Figure 5A:
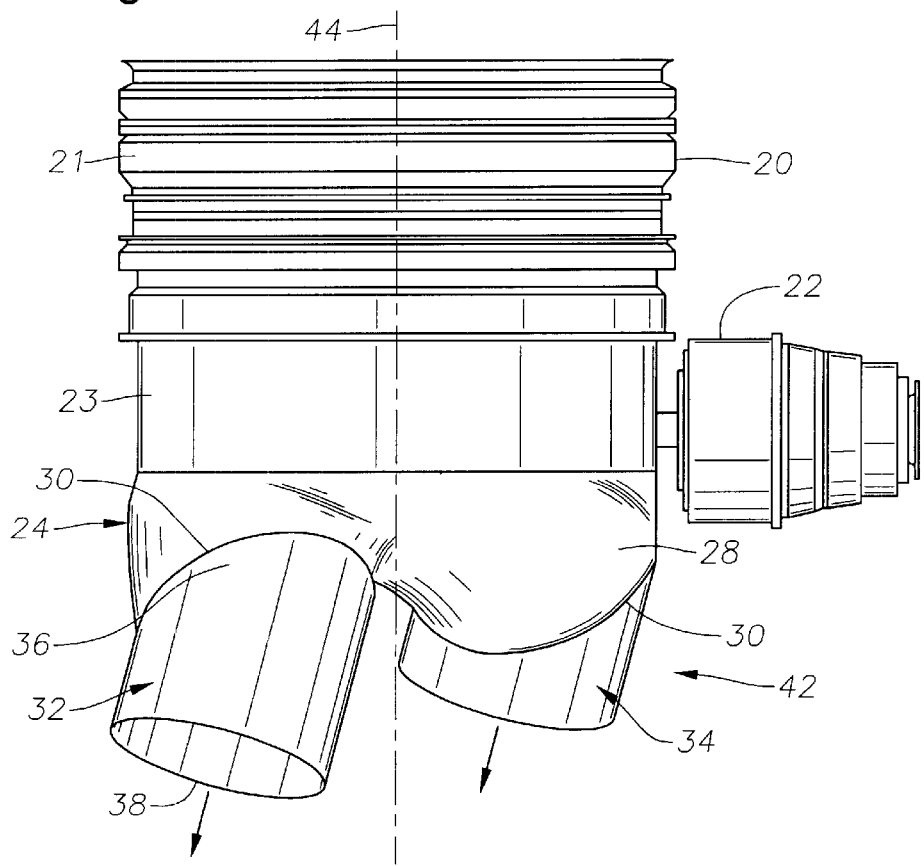
FIG. 5a is a side view of portions of the exhaust system wherein the exhaust nozzles are configured to direct exhaust 15 degrees forward.
Figure 5B:
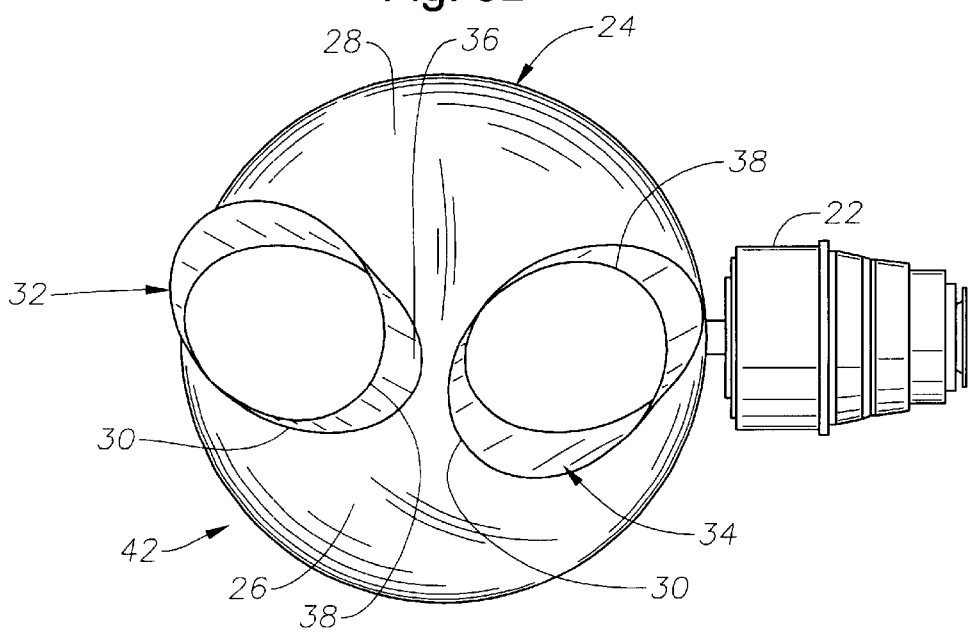

In FIGS. 5a and 5b, the exhaust assembly 42 in a configuration wherein the nozzles 32, 34 are oriented so that exhaust from the plenum chamber 24 is vectored forwardly from the vertical plane at an angle of approximately 20 degrees. To achieve this position, the nozzles 32, 34 have been further rotated within their respective circular openings 30 until the nozzles 32, 34 are oriented at the appropriate angle.

From the above description, it can be seen that the exhaust assembly 42 permits exhaust gases to be vectored from the plenum chamber 24 at angles within a range from 20 degrees forward of vertical plane 44 to 60 degrees aft of vertical plane 44. Generally, 180 degrees of rotation will vector the thrust from stop to stop.

During adjustment of the nozzles 32, 34 from position to position, the nozzles 32, 34 are rotated in opposite directions from one another so that the lateral thrust forces generated by the exhaust gases being emitted from the nozzles 32, 34 will offset one another and, thereby, reduce or eliminate the inducement of yawing moments to the aircraft 10. It is also noted that the nozzles 32, 34 provide a constant area for exhaust of gases regardless of the orientation of the nozzles 32, 34 with respect to the plenum chamber 24, in contrast to arrangements like louvers, which vary exhaust area with deflection angle.

It will be apparent to those skilled in the art that modifications, changes and substitutions may be made to the invention shown in the foregoing disclosure. Accordingly, it is appropriate that the appended claims be construed broadly and in the manner consisting with the spirit and scope of the invention herein.

What is claimed is:

1. An exhaust system for a V/STOL aircraft comprising:
    a. a plenum chamber disposed proximate a thrust engine, the plenum chamber operable to contain exhaust gases generated by the thrust engine; and
    b. first and second exhaust nozzles directly extending outwardly from the plenum chamber to receive exhaust gases therefrom and direct the gases away from the plenum chamber, the first nozzle being mounted forward of the second nozzle.

2. The exhaust system of claim 1 wherein the plenum chamber comprises a pair of circular exhaust openings, and the first and second nozzles each comprise:
    a. a distal end for discharge of exhaust gases; and
    b. a proximal end for receipt of exhaust gases from the plenum chamber, the proximal end being mounted to a circular exhaust opening so that the nozzle is rotatable within the exhaust opening.

3. The exhaust system of claim 2 wherein the circular openings are disposed in a plane that is oriented at an angle from a vertical plane.

4. The exhaust system of claim 3 wherein the angle from the vertical plane is approximately 40 degrees.

5. The exhaust system of claim 2 wherein the distal ends of the first and second nozzles each present a substantially oval shape.

6. An exhaust system for a V/STOL aircraft comprising:
    a. an exhaust flow tube proximate a thrust engine for transmission of exhaust gases generated by the thrust engine;
    b. a first exhaust nozzle directly extending outwardly from the exhaust flow tube for vectoring exhaust, the exhaust nozzle being selectively rotatable with a circular opening to alter the direction of vectoring; and
    c. a second exhaust nozzle being mounted in a one-behind-the-other relation with the first exhaust nozzle.

7. The exhaust system of claim 6 further comprising a plenum chamber for the containment of exhaust gases, the plenum chamber receiving exhaust gases from the exhaust flow tube and transmitting said cases to said first exhaust nozzle.

8. The exhaust system of claim 7 wherein the plenum chamber comprises a shell having a circular exhaust opening within which the first exhaust nozzle is selectively rotated.

9. The exhaust system of claim 8 wherein the shell of the plenum chamber defines a curved exhaust tube.

10. The exhaust system of claim 6 wherein the first nozzle presents an oval cross-section.

11. The exhaust system of claim 10 wherein the first exhaust nozzle comprises:
    a. a proximal end providing an opening that is substantially circular in shape; and b. a distal end providing an opening that is substantially oval in shape.

12. The exhaust system of claim 11 wherein the proximal end opening is cut at an angle to the longitudinal axis of the nozzle.

13. An exhaust system for a V/STOL aircraft comprising:
   a. an exhaust flow tube proximate a thrust engine for transmission of exhaust gases generated by the thrust engine;
   b. a plenum chamber associated with the exhaust flow tube to receive exhaust gases therefrom and contain the gases; and
   c. first and second exhaust nozzles affixed to and directly extending outwardly from the plenum chamber and being independently moveable with respect thereto to vector exhaust gases from the plenum chamber, the first and second nozzles being mounted in a one-behind-the-other relation upon the plenum chamber.

14. The exhaust system of claim 13 wherein the first and second nozzles are moveable to vector exhaust in a range from approximately 20 degrees forward of vertical to approximately 60 degrees aft of vertical.

15. The exhaust system of claim 13 wherein the plenum chamber defines two circular openings within which the first and second nozzles are mounted for rotational movement there within.

16. A method of exhausting gases from a thrust engine within a V/STOL aircraft comprising:
   a. transmitting exhaust gases from a thrust engine to a plenum chamber disposed proximate the thrust engine, and containing the exhaust gases within the chamber; and
   b. transmitting exhaust gases away from the plenum chamber through first and second exhaust nozzles directly extending outwardly from the plenum chamber, the first and second nozzles being mounted in a one-behind-the-other relation upon the plenum chamber.

17. The method of claim 16 further comprising the operations of rotating the proximal ends of said first and second nozzles within openings in the plenum chamber to angularly orient the nozzles.

18. The method of claim 16 wherein the operation of transmitting exhaust gases from a thrust engine to a plenum chamber comprises disposing exhaust gases into an exhaust flow tube and transmitting the gases from the thrust engine to the plenum chamber.

19. The method of claim 17 wherein the operation of rotating the proximal ends of said nozzles further comprises rotating the proximal end of the first nozzle in one direction and the proximal end of the second nozzle in the opposite direction.

* * * * *